Aug. 6, 1935. A. A. ANDERSON 2,010,743
AIRCRAFT
Filed April 26, 1933 2 Sheets-Sheet 1
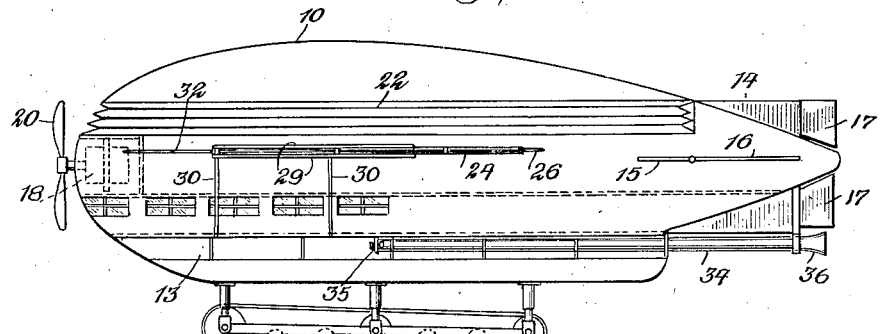
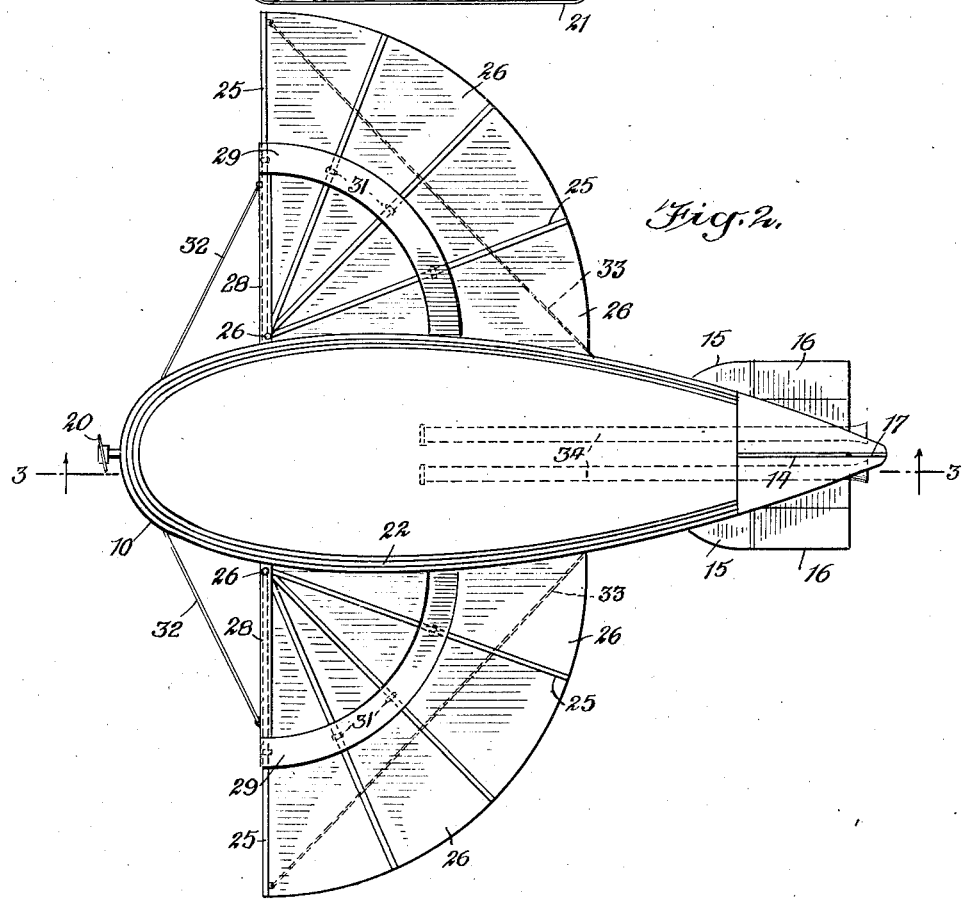
INVENTOR
A. A. Anderson Aug. 6, 1935.  A. A. ANDERSON  2,010,743
AIRCRAFT
Filed April 26, 1933  2 Sheets-Sheet 2
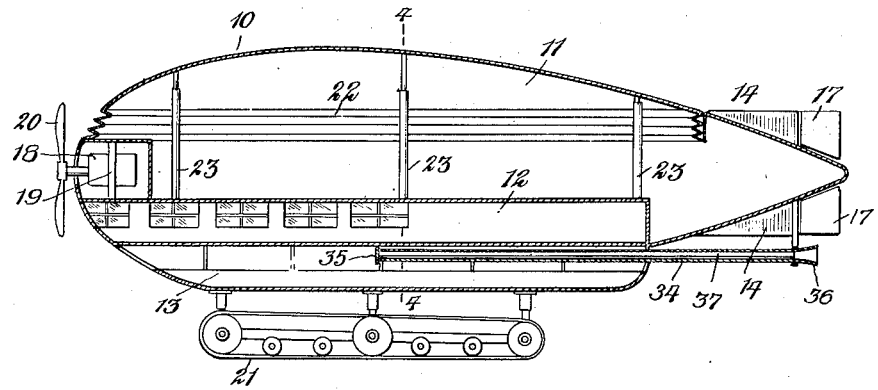
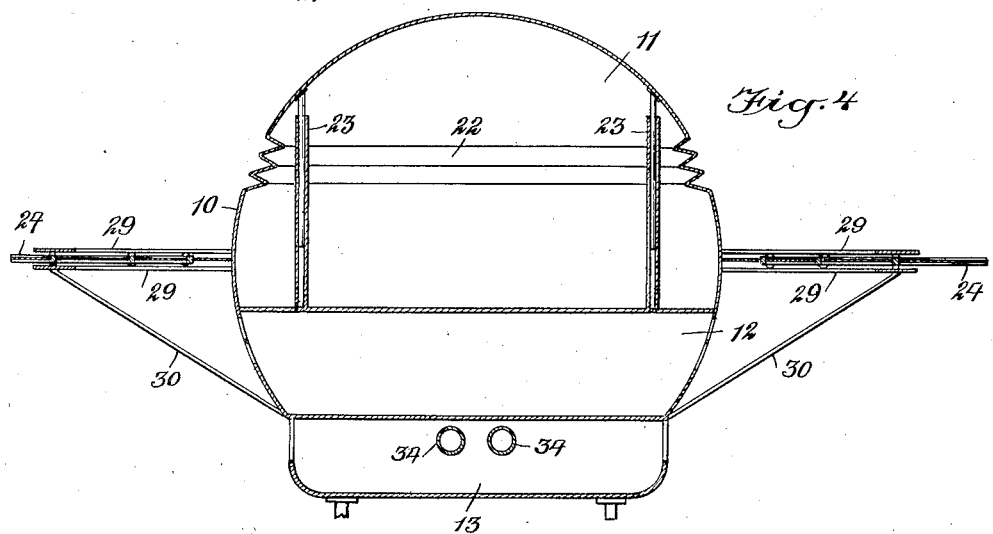
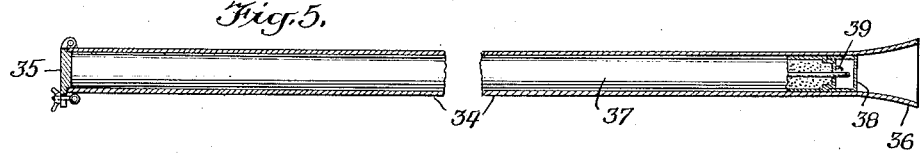
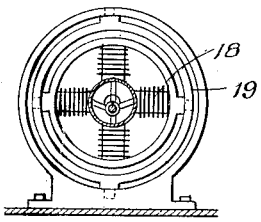
WITNESSES
INVENTOR
A. A. Anderson
BY
ATTORNEYS Patented Aug. 6, 1935

2,010,743

UNITED STATES PATENT OFFICE 2,010,743

AIRCRAFT

Abram A. Anderson, New York, N. Y.

Application April 26, 1933, Serial No. 668,124

3 Claims. (Cl. 244—3)

This invention relates to an aircraft for attaining high speeds at relatively low and high altitudes.

An object of the invention is the provision of an aircraft whose weight is annulled by its buoyancy, so that it may readily ascend and descend, and so that at relatively low altitudes, under the aerodynamic action of one or more propellers, is capable of attaining unusually high speed, as well as ordinary speed.

Another object of the invention is the provision of an aircraft, as characterized above, which may ascend to upper atmosphere or stratosphere, and, under controlled or direct rocket action therein, attain very great speed in translatory flight.

A further object of the invention is the provision of an aircraft embodying features whereby a take-off and a landing may be made in a relatively small space, or in other words, without requiring considerable travel of the craft along the ground before taking off, and after descension to the ground.

A further object of the invention is the provision in an aircraft of a novel wing construction which may be readily extended to aid in sustaining the craft, and which also may be readily collapsed so as to offer little or no resistance when not in use.

Another object of the invention is the provision in an aircraft of a main body or hull for suitable gas to buoy the craft, and which body or hull embodies a novel feature of construction whereby to compensate for expansion and contraction of the gas, and also to vary its capacity, to attain a variation in its buoyancy.

The nature and the distinguishing features of the invention will appear when the following specification is read in connection with the accompanying drawings, in which—

Figure 1 is a side elevation of an aircraft embodying the features of the invention.

Figure 2 is a plan view.

Figure 3 is a longitudinal section taken on the line 3—3 of Figure 2.

Figure 4 is an enlarged transverse section taken on the line 4—4 of Figure 3.

Figure 5 is an enlarged longitudinal section through one of the rocket barrels, a portion thereof being broken away.

Figure 6 is a view of the engine mounting.

Referring now more particularly to the drawings, it will be apparent that there has been shown an aircraft including a main sustaining body or hull 10 adapted to be filled with a gas lighter than air. The body 10 may be of rigid or semi-rigid construction. The body 10 is substantially of ellipsoidal or streamline formation. The body 10 is sub-divided to provide a gas chamber 11, compartment 12 for passengers and part of the crew, and a compartment 13, the purpose of which will be explained hereinafter. The stern of the body 10 is equipped with the usual vertical and horizontal stabilizers 14 and 15 respectively, elevator 16 and rudder 17. It is to be understood that the proper means for controlling the elevator 16 and the rudder 17 will be employed, the said means not having been shown since they are well known. The body 10 may have mounted thereon one or more engines for driving one or more propellers. In the present instance, there is conventionally illustrated one engine 18 which is arranged at the bow of the body 10. This engine is mounted for universal movement in a gimbal 19. The engine 18 drives a tractor type propeller 20. It will be apparent that by mounting the engine and its propeller 20 for universal movement, the latter may be disposed at any desired angle of attack not only to generate lift but also to cause translatory movement of the craft. The body 10 is equipped with any suitable landing gear 21.

The chamber 11 of the body is filled with a suitable non-inflammable gas such as helium to annul the weight of the craft, or in other words to make it buoyant in the air. The body 10 embodies an intermediate collapsible portion 22 of bellows construction extending longitudinally entirely around the body whereby the capacity of the gas chamber 11 may be varied to compensate for expansion and contraction of the gas due to variations in atmospheric temperature, and also to vary the size of the same according to the amount of gas used in attaining the desired buoyancy. Suitable bracing means 23 is employed, the same being secured to the top and bottom walls of the gas chamber above and below the collapsible portion 22 in order to prevent distortion, and at the same time allow for proper action of the collapsible portion 22 for the purpose mentioned.

In accordance with another feature of the invention, the craft may be equipped with wings 24 in order to aid the buoyant body 10 in sustaining the craft and also to cooperate with the propeller 20 in generating lift. Each of the wings 24 is of a collapsible construction and adapted to be extended laterally to produce a dynamic reaction to aid in lifting the craft. The wings 24 are arranged respectively on opposite sides of the body 10 somewhat forward of the transverse axis of the body. Each wing consists of a plurality of ribs 25, each of which has its inner end pivotally connected with a common vertical pivot 26 secured to the side of the body 10 in close proximity thereto. Triangular shape wing sections 27 of suitable flexible material span the ribs 25, and the section 27 adjacent the body 10 has the adjacent edge thereof secured to the body 10. It will be apparent that the ribs 25 and wing sections 27 constitute a fan-like wing as shown. A channel member 28 extends laterally outward from the body 10 perpendicular to the longitudinal axis of the body in relation to each wing 24. Spaced arcuate upper and lower guide and sustaining members 29 are fixedly secured to the channel member 28 and the body 10 in relation to each wing 24 with the latter disposed between said members 29. The members 29 may be suitably braced as at 30. The ribs 25 may be provided with rollers 31 which roll in contact with the opposing surfaces presented by the members 29 to facilitate movement of these parts in spreading and collapsing each wing. Suitable means including cables 32 and 33 leading to the control room may be employed for spreading and collapsing each wing 24 and to maintain the same in these conditions. It will be apparent that the channel member 28 associated with each wing limits the forward movement of the outermost rib 25 to a position in which the wing sections 27 will be held taut as shown most clearly in Figure 2. When the wings 24 are collapsed, they will be disposed close to the sides of the body 10 to offer little or no resistance or drag in the forward movement of the craft, when it is desired to dispense with the lifting effect of the wings.

From the foregoing it will be understood that there has been described an aircraft which may readily ascend and descend and will be capable of attaining unusually high speed, as well as ordinary speed, at relatively low altitudes, and that the craft is also efficient to ascend to upper atmosphere or stratosphere in which there is a decreased density of the atmosphere. The craft is capable of ascending to upper atmosphere or stratosphere due to the buoyancy thereof and the aerodynamic action of the propeller 20.

In order to propel the craft at high speed in the upper atmosphere or stratosphere, use is made of rockets, the action of which are controlled by suitable means. The rockets are relied upon to attain the high speed in the upper atmosphere or at high altitude in lieu of the engine and propeller. The loss of density of the air at high altitude is compensated by the increased efficiency of the rocket, and it is well known that with direct rocket action, the efficiency is increased inversely to the density of the atmosphere. As shown in the drawings, use is made of two rocket tubes or barrels 34, each of which is secured to the body and extends parallel to the longitudinal axis of the body. Each tube or barrel 34 is disposed in part within the compartment 13 and extends rearwardly and exteriorly thereof as shown most clearly in Figures 1 and 3. Each barrel 34 has a loading breech 35 on its forward end and the rearward end thereof is open and flares as shown at 36. A suitable number of rockets will be kept ready for use in the compartment 13. The principle on which each rocket operates involves the force which is generated by the expansion of gases upon the igniting of the ignition means of the rocket. Any suitable means may be employed. Each rocket may consist of effective units which are set off at proper intervals. The rocket indicated at 37 in Figure 5 is arranged in each barrel 34 by opening the breech 35 after which the latter is closed. A suitable protecting cap 38 is arranged over the rear end of the rocket which has applied thereto the ignition means 39, to prevent unintentional ignition. After the rockets have been ignited, the gas escapes at the rear ends of the barrels 34, and the blast of gases issuing therefrom into the atmosphere in conjunction with the barrels 34 will result in the propulsion of the craft at high speed. On returning into denser air of a lower altitude, the propeller 20 will again be used for propelling the craft and also to aid in directing its movements not only forwardly but also up and down in conjunction with the control means employed for maneuvering the craft.

It is, of course, to be understood that other forms of propulsion may be employed, as, for example, I may employ instead of the rocket mechanism a nozzle for the exit of gases arranged in the combustion space of suitable form and adapted to give the maximum thrust, with means for introducing into the combustion chamber a fuel, such as gasolene, with either air, compressed by the motion of the plane, or liquid oxygen, suitably controlled. In other words, I may employ as propulsion means not only the means illustrated in the drawings but various other means, and various slight changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. In an aircraft, in combination, a main sustaining body, wings arranged on the opposite sides of said body, each of said wings being secured along one edge of the body, each of said wings being pivoted to collapse against said body, fixed upper and lower guide and sustaining members extending laterally outward from the body for each of said wings between the ends thereof, each wing being disposed between said members for movement in contact therewith, to facilitate extending and collapsing of the wing and to aid in sustaining the wing laterally disposed when extended.

2. In an aircraft, in combination, a main sustaining body, collapsible wings arranged on the opposite sides of said body, suitably braced rigid members extending laterally outward from said body at the opposite sides thereof, each of said wings being secured along one edge to the body, upper and lower arcuate guide and sustaining members extending laterally with respect to the body for each wing between the ends thereof, said last members having the opposite ends secured respectively to the rigid member on the same side of the body and to the body, each wing being disposed between said last members for movement in contact therewith, to facilitate extending and collapsing of the wing and to aid in sustaining the wing laterally disposed when extended.

3. In an aircraft, in combination, a main sustaining body, wings arranged on the opposite sides of said body, each of said wings being secured along one edge to the body, each of said wings being collapsible against said body, fixed upper and lower guide and sustaining members extending laterally outward from the body for each of said wings between the ends thereof, each wing being disposed between said members for movement in contact therewith, to facilitate extending and collapsing of the wing and to aid in sustaining the wing laterally disposed when extended, and means extending laterally outward from the body for each wing, to engage the leading edge of the wing to limit the extension of the wing to a definite relation to the body.

ABRAM A. ANDERSON.